United States Patent [19]

Diamantoglou

[11] Patent Number: 5,055,570

[45] Date of Patent: Oct. 8, 1991

[54] CUPRAMMONIUM-STABLE CELLULOSE ESTERS AND CARBAMATES FOR DIALYSIS MEMBRANES

[75] Inventor: Michael Diamantoglou, Erlenbach, Fed. Rep. of Germany

[73] Assignee: Akzo N.V., Netherlands

[21] Appl. No.: 389,767

[22] Filed: Aug. 4, 1989

[30] Foreign Application Priority Data

Aug. 4, 1988 [DE] Fed. Rep. of Germany ....... 3826468

[51] Int. Cl.$^5$ ................... C08B 11/00; C08B 11/187; C08B 11/08; C08B 11/12
[52] U.S. Cl. ...................................... 536/84; 536/93; 536/94; 536/95; 536/97; 536/98; 536/99; 210/500.24; 210/500.29
[58] Field of Search .................. 536/84, 93, 94, 95, 536/97, 98, 99; 210/500.29, 500.3, 500.31, 500.32, 500.24

[56] References Cited

U.S. PATENT DOCUMENTS

| | | | |
|---|---|---|---|
| 3,475,410 | 10/1969 | Britton | 536/43 |
| 4,668,396 | 5/1987 | Baurmeister et al. | 210/655 |
| 4,872,983 | 10/1989 | Diamantoglou et al. | 210/500.29 |

FOREIGN PATENT DOCUMENTS

| | | |
|---|---|---|
| 0061312 | 9/1982 | European Pat. Off. |
| 0155534 | 9/1985 | European Pat. Off. |
| 0172437 | 2/1986 | European Pat. Off. |
| 0232442 | 8/1987 | European Pat. Off. |
| 1720087 | 6/1971 | Fed. Rep. of Germany |
| 2705735 | 8/1978 | Fed. Rep. of Germany |
| 2748858 | 5/1979 | Fed. Rep. of Germany |
| 3410133 | 3/1985 | Fed. Rep. of Germany |
| 3341113 | 5/1985 | Fed. Rep. of Germany |
| 3430503 | 2/1986 | Fed. Rep. of Germany |
| 3438531 | 4/1986 | Fed. Rep. of Germany |
| 3524596 | 1/1987 | Fed. Rep. of Germany |
| 57-162701 | 10/1982 | Japan |
| 57-162702 | 10/1982 | Japan |
| 60-203265 | 10/1985 | Japan |

OTHER PUBLICATIONS

"Biocompatibility of Hemodialysis Membranes", *Asaio Journal*, Apr./Jun. 1984, vol. 7.
"Anaphylatoxin Formation During Hemodialysis: Effects of Different Dialyzer Membranes" by Dennis E. Chenoweth, Alfred K. Cheung, and Lee W. Henderson, Kidney International, vol. 24, 1983, pp. 764-769.

*Primary Examiner*—Nathan M. Nutter
*Attorney, Agent, or Firm*—Oliff & Berridge

[57] ABSTRACT

A cellulose derivative comprising substitution-modified cellulose regenerated from a cuprammonium solution, the substituents being ester groups, wherein the acyl group represents one or more, optionally substituted, carbon chains with 10-36 carbon atoms, or a residue containing at least one aromatic and/or heterocyclic, optionally substituted, ring, or wherein the substituents are carbamate groups, the carbamoyl group of which represents a group containing one or more, optionally substituted, carbon chains with 2-36 carbon atoms, or a group containing at least one aromatic and/or heterocyclic, optionally substituted, ring. A dialysis membrane made from the substitution-modified cellulose, typically in the form of a flat film, a tubular film, or a hollow filament, is also disclosed.

15 Claims, 2 Drawing Sheets

CUPRAMMONIUM-STABLE CELLULOSE ESTERS AND CARBAMATES FOR DIALYSIS MEMBRANES

BACKGROUND OF THE INVENTION

The invention relates to the chemical modification of cellulosic dialysis membranes to improve their biocompatibility.

West German Patent 2,705,735 discloses a dialysis membrane for hemodialysis with antithrombogenic compounds chemically bonded thereto, the dialysis membrane consisting of two or more layers of a cellulose regenerated from cuprammonium solutions. This cellulose was obtained from separately fed holes in a spinneret and contains the antithrombogenic-active substances in chemically bonded form.

Laid-open West German Patent Application 2,748,858 of 31 Oct., 1977 describes the preparation of antithrombogenic polymer materials prepared by the following process:

Reaction of reactive polymers with synthetic fibrinolytic compounds (covalent bonding)

Treatment of polymers containing anion-exchange groups with a synthetic fibrinolytic compound (ionic bonding);

Treatment of polymer materials with solutions of synthetic fibrinolytic compounds (adsorption).

Such a membrane modification is ruled out, since biocompatibility-improving compounds that are bonded only adsorptively to the polymer can pass into the bloodstream during dialysis.

U.S. Pat. No. 3,475,410 of 28 Oct. 1969 and the publication in Vol. XII Trans. Amer. Soc. Artif. Int. Organs, 1966, pp. 139-150 describe antithrombogenic cellulose membranes that are obtained by treatment of the cellulose, first with ethyleneimine, then with heparin. According to our studies, however, membranes modified with ethylamino groups have lower biocompatibility than unmodified membranes.

Japanese Applications 57-162,701 and 57-162,702 also claim antithrombogenic cellulose membranes. These are prepared by grafting vinyl monomers onto cellulose or cellulose derivatives, followed by heparinization. In addition to the grafting reaction, however, a homopolymerization is also to occur. Although no permanent bond exists between the homopolymerized product and cellulose, the former cannot be completely removed from the membrane despite intensive washing. Therefore, small amounts of the heparinized product can always pass into the bloodstream during blood dialysis.

Japanese Kokai 60-203,265 describes high molecular weight cellulose products for making medical instruments with anticoagulant properties. It involves mixtures of polycationic and polyanionic cellulose derivatives, which are normally obtained by intermixing appropriate polymer solutions. Such water-insoluble salts are unsuitable as membrane materials, since the danger always exists that they will be converted by double decomposition effects into a compound that is water-soluble or strongly swellable in water.

However, it has already been proposed in West German Laid-open Application 1,720,087 to reduce the risk of blood coagulation by reacting the polymer material of the membrane with an alkyl halide and thereafter reacting the resulting material with an alkali metal salt of an antithrombogenic material with cationic residue (e.g., heparin or a heparinoid compound), whereby the possible alkyl halides may also include haloalkyldialkylamines. Cellulose and cellulose acetate are among the possible polymers.

An antithrombogenic effect of these dialysis membranes is observed only if the degree of substitution of the modified cellulose is high, i.e., higher than at least 0.1, and when a preheparinization with relatively high heparin concentration (solutions with 0.1 to 1 weight percent) is performed in a separate step.

West German Laid-open Application 3,341,113 discloses a dialysis membrane in the form of flat films, tubular films or hollow filaments consisting of regenerated cellulose, wherein polymeric acids are chemically bonded at least to one membrane surface by means of bridge-forming agents chemically bonded to the cellulose. Aside from the fact that the production is relatively expensive, even though it is performed in a posttreatment, the effectiveness is substantially limited to a reduction of leukopenia. Because of the large molecules of the polymeric acids, bonding by means of the bridge-forming agents occurs only at the surface of the membrane.

Furthermore, West German Laid-open Application 3,438,531 discloses a dialysis membrane wherein isocyanate prepolymers are bonded to the cellulose. The effectiveness is limited in a manner similar to that described hereinabove to celulose membranes modified with polymeric acids.

A dialysis membrane with improved biocompatibility has become known from West German Laid-open Application 3,524,596, which is characterized by the fact that the mean degree of substitution of a modified cellulose is equal to 0.02 to 0.07. Suitable celluloses modified by substitution are esterified or etherified celluloses. Preferably, the dialysis membrane from cellulose contains such modified cellulose that has a structure represented by the formula

Cellulose-R'—X—Y wherein
X stands for —NR"— and/or —N+R"$_2$ and/or —S— and/or —SO— and/or —SO$_2$— and/or —CO—NR— and/or —CO—O— and/or —O—;
Y stands for —R and/or —NR$_2$ and/or —Si(OR")$_3$ and/or —SO$_3$H and/or —COOH and/or —PO$_3$H$_2$ and/or —N+HR$_2$ or salts thereof;
R' stands for an alkylene group and/or cyclo alkylene group and/or arylene group with a total of 1 to 25C atoms;
R" stands for a hydrogen atom or R, and
R stands for an alkyl group with 1 to 5C atoms and/or a cycloalkyl group and/or aryl group.

This dialysis membrane was already capable of reducing blood coagulation, leukopenia and complement activation to a considerable degree. However, adsorption of beta-2-microglobulin to a noteworthy degree was not successfully achieved.

Apart from the fact that dialysis membranes from synthetic or natural polymers, when used in artificial kidneys, can very easily induce blood coagulation, which is substantially prevented by appropriate drug treatment, in the case of dialysis membranes from regenerated cellulose there is often a temporary decrease in leukocytes in the first period of dialysis treatment when a kidney patient is treated with dialyzers having cellulose membranes. This effect is caled leukopenia.

Leukopenia is a reduction in the number of leukocytes (white blood corpuscles) in the circulating blood. The number of white blood corpuscles in humans is about 4,000 to 12,000 cells/mm$^3$.

Leukopenia associated with dialysis is most pronounced 15 to 20 min after the start and it is possible for the neutrophils (which are the leukocytes which can be stained with neutral or simultaneously with acidic and basic dyes) to disappear almost completely. Subsequently, the number of leukocytes recovers again within about one hour to almost the initial level or exceeds it.

If, after the leukocytes have recovered, a new dialyzer is connected, leukopenia will occur again to the same extent.

Cellulose membranes cause pronounced leukopenia. Even though the clinical significance of leukopenia has not been scientifically elucidated, there is nevertheless a desire for a dialysis membrane for hemodialysis which does not exhibit the leukopenic effect, without thereby deleteriously affecting the other very desired properties of dialysis membranes from regenerated cellulose.

In the case of hemodialysis using membranes from regenerated cellulose, a distinct complement activation has also been found beside the leukopenia. The complement system within the blood serum is a complex plasma-enzyme system which consists of many components and acts in various ways to prevent damage due to invading foreign cells (bacteria etc.). When antibodies against the invading organism are present, there can be complement-specific activation by the complex of the antibodies with antigenic structures of the foreign cells, otherwise complement activation takes place by an alternative pathway due to special surface features of the foreign cells. The complement system is based on a multiplicity of plasma proteins. After activation, these proteins react specifically in a specific sequence with one another and, finally, a cell-damaging complex which destroys the foreign cell is formed.

Individual components release peptides which induce inflammatory manifestations and can occasionally also have undesired pathological consequences for the organism. It is assumed that in the case of hemodialysis membrane made from regenerated cellulose the activation takes place by the alternative pathway. These complement activations are detected objectively by determining the complement fragments $C_{3a}$ and $C_{5a}$.

In this connection, reference is made to the following studies: D. E. Chenoweth et al., Kidney International vol. 24, pages 746 ff., 1983 and D. E. Chenoweth, Asaio-Journal vol. 7, pages 44 ff., 1984.

An object of the present invention was to provide biocompatible dialysis membranes of regenerated cellulose in the form of flat films, tubular films or hollow filaments, which membranes have good biocompatibility for the lowest possible degree of substitution of modified celluloses and in which the cellulose was regenerated in the cuprammonium process. Cellulose esters and cellulose carbamates cannot be readily processed in the cuprammonium process, because, on the one hand, they are insoluble for higher degrees of substitution and, on the other, they are readily saponified in the alkaline medium of the cuprammonium solution.

BRIEF SUMMARY OF THE INVENTION

In one aspect, the present invention relates to a substitution-modified cellulose regenerated from a cuprammonium solution and wherein the substituents are selected from the group consisting of a substituted or unsubstituted acyl group having a carbon chain of from 10 to 36 carbon atoms, a substituted or unsubstituted acyl group containing at least one heterocyclic ring, a substituted or unsubstituted acyl group containing at least one optionally substituted aromatic ring, a substituted or unsubstituted carbamoyl group having a carbon chain of from 2 to 36 carbon atoms, a substituted or unsubstituted carbamoyl group containing at least one optionally substituted heterocyclic ring, and a substituted or unsubstituted carbamoyl group containing at least one optionally substituted aromatic ring.

In another aspect, the invention is a dialysis membrane comprising substitution-modified cellulose regenerated from a cuprammonium solution and wherein the substituents are selected from the group consisting of a substituted or unsubstituted acyl group having a carbon chain of from 10 to 36 carbon atoms, a substituted or unsubstituted acyl group containing at least one optionally substituted heterocyclic ring, a substituted or unsubstituted acyl group containing at least one optionally substituted aromatic ring, a substituted or unsubstituted carbamoyl group having a carbon chain of from 2 to 36 carbon atoms, a substituted or unsubstituted carbamoyl group containing at least one optionally substituted heterocyclic ring, and a substituted or unsubstituted carbamoyl group containing at least one optionally substituted aromatic ring.

DESCRIPTION OF THE PREFERRED EMBODIMENTS

Figure 1:
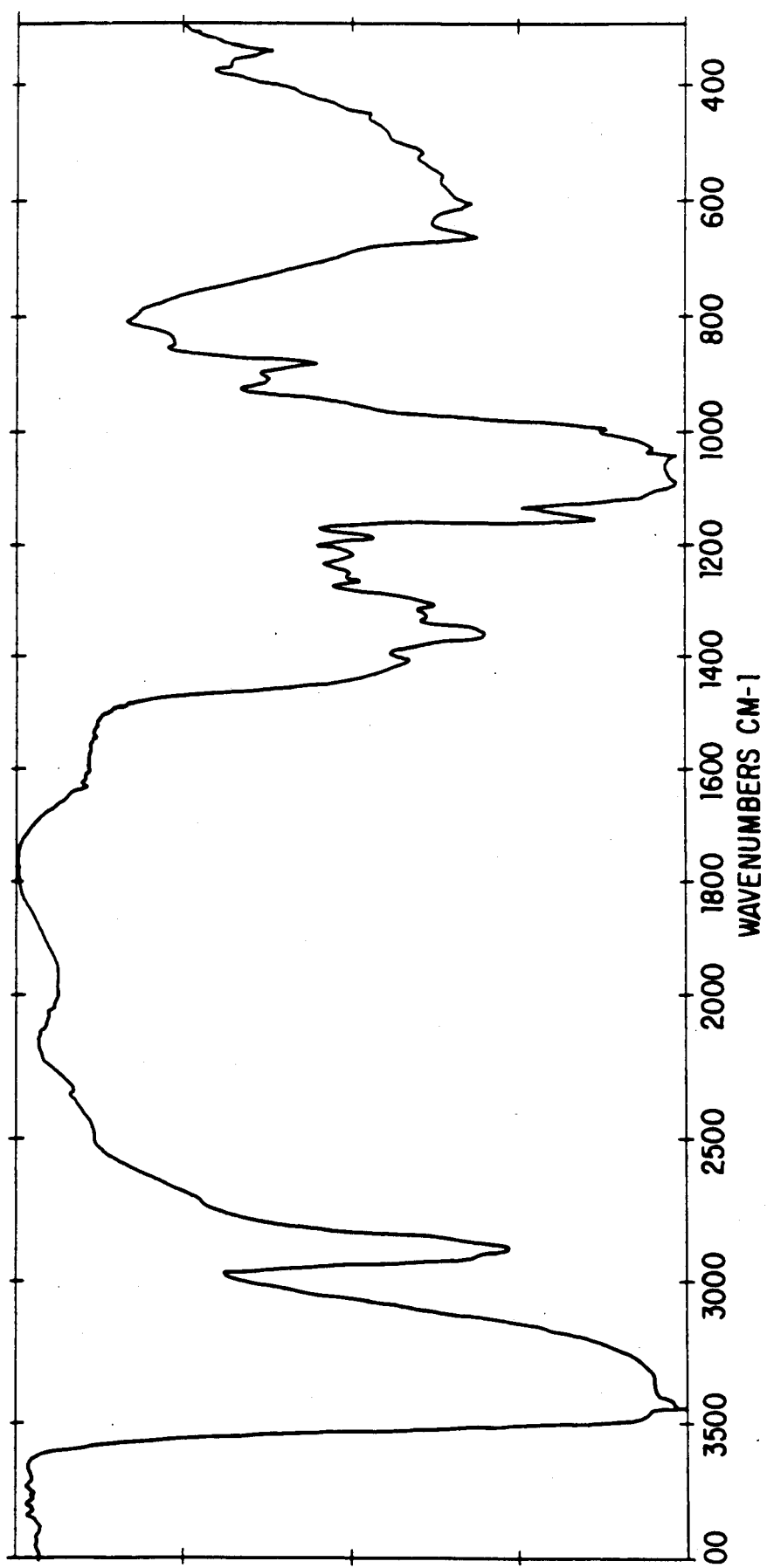
FIG. 1 is the IR spectrum of the dialysis membrane prepared according to Comparison Example 1.

Unexpectedly, it has now been found that cellulose can be regenerated from cuprammonium solution containing up to a certain proportion of selected cellulose esters without saponification of the cellulose esters to a substantial degree if they are characterized by the fact that the acyl group represents one or more, optionally substituted, carbon chains with 10 to 36 carbon atoms, or a residue containing at least one aromatic and/or heterocyclic, optionally substituted ring.

Preferably, the degree of substitution of the cellulose in the dialysis membrane is equal to 0.01 to 0.5. A degree of substitution of 0.01 to 0.02 is especially preferred.

This object is also achieved by a dialysis membrane for hemodialysis comprising substitution-modified cellulose, regenerated from cuprammonium solution, in the form of flat films, tubular films or hollow filaments, when the substituents are carbamate groups, the carbamoyl residue of which represents one or more, optionally substituted, carbon chains with 2 to 36 carbon atoms, or a residue containing at least one aromatic and/or heterocyclic, optionally substituted, ring.

Preferably, the degree of substitution in the dialysis membrane here is equal to 0.01 to 0.9. A degree of substitution of 0.01 to 0.6 is especially preferred.

In a special embodiment of the invention, the carbon chain of the substituents is interrupted by hetero atoms such as O, S, N, P and Si as well as by —CO—, —CONR—, —COO—, —SO— and/or —SO$_2$— groups.

EXAMPLES

The following Examples are intended to further describe the invention by illustrative specific embodiments of the generic invention, and are not intended to limit the generic invention in any manner whatsoever.

Complement activation within the scope of the present invention was assessed on the basis of the $C_{5a}$ fragments. For this purpose, 300 ml of heparinized blood plasma was recirculated in vitro through a dialyzer with an effective exchange area of 1 m² at a plasma flow rate of 100 ml/min for a period of 4 hours. The $C_{5a}$ fragments in the plasma were determined using the RIA method (Amersham test). The relative complement activation for the particular time of measurement was calculated as a percentage by forming the ratio of the concentration at the time of sampling with the initial value. The measured value after a 4-hour recirculation time was used for evaluation. Flat membranes were incubated with heparinized blood plasma for 3 hours, after which the $C_{5a}$ fragments were determined.

The average degree of polymerization DP was determined in a cupriethylenediamine solution by the DIN 54270 method.

The carbamate content and/or degree of esterification were determined on the basis of the analytical results which are and typical for the substituents, for example, nitrogen by the Kjeldahl method, sulfur by the Schoeniger method or phosphorus by the molybdate method, if necessary from the difference between before and after saponification.

COMPARISON EXAMPLE 1

By reacting linters cellulose with propionic anhydride, cellulose propionate with a degree of acylation of DS=0.62 was prepared by a known process. From this material, a cellulose cuprammonium solution with a 6% content of cellulose derivative was prepared by a conventional process and converted into flat membranes. These were then checked for propionic acid content and complement activation.

Propionic acid was detectable neither chemically nor by IR spectrometry (IR spectrum, FIG. 1). This indicates complete saponification of the cellulose propionate in the cuprammonium solution. The $C_{5a}$ activation was in the range of the unmodified cellulose membrane.

COMPARISON EXAMPLE 2

A cellulose cuprammonium solution with 6% ester content was prepared from cellulose hexanoic acid ester prepared by a process, converted into flat membranes and examined.

The membranes had a degree of acylation of DS=0.05. The reduction in $C_{5a}$ compared with the unmodified membrane was 30%.

EXAMPLE 1

A cellulose cuprammonium solution with 6% ester content was prepared from cellulose dodecenylsuccinate prepared by a process, converted into flat membranes, and examined.

The membranes produced in this manner had a degree of acylation of DS=0.018. The reduction in $C_{5a}$ compared with the unmodified membrane was 96%.

EXAMPLE 2

A cellulose cuprammonium solution with 6% carbamate content was prepared from cellulose phenylcarbamate prepared by a process, converted into flat membranes and examined.

Figure 2:
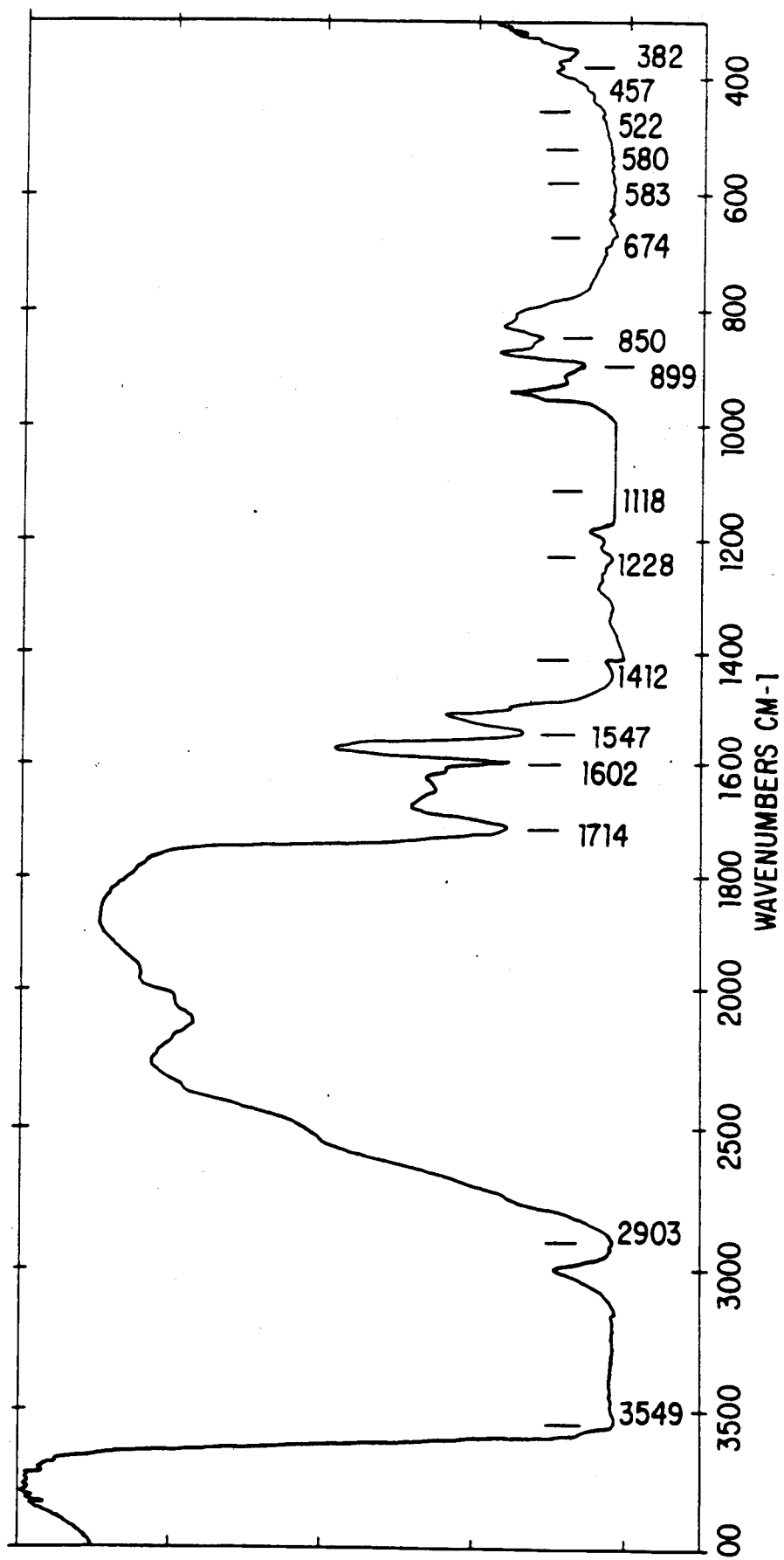
FIG. 2 is the IR spectrum of the dialysis membrane prepared according to Example 2.

The membranes produced in this fashion had a carbamate content of DS=0.16. In the IR spectrum (FIG. 2), the corresponding carbamate bands at 1714, 1602 and 1547 cm$^{-1}$ are clearly visible. The reduction in $C_{5a}$ compared with the unmodified membrane was 88%.

EXAMPLES 3-7

Cellulose cuprammonium solutions with 6% polymer content were prepared from cellulose palmitate, stearate, oleate, butylcarbamate and cyclohexylcarbamate prepared by a process and converted into flat membranes, and their $C_{5a}$ activation was determined. The results are compiled in Table 1.

TABLE 1

| Example | Cellulose derivative | Degree of substitution | Reduction in $C_{5a}$ (%) |
|---|---|---|---|
| 3 | Palmitate | 0.011 | 65 |
| 4 | Stearate | 0.013 | 60 |
| 5 | Oleate | 0.014 | 70 |
| 6 | Butylcarbamate | 0.015 | 79 |
| 7 | Cyclohexylcarbamate | 0.012 | 85 |

What is claimed is:

1. A substitution-modified cellulose regenerated from a cuprammonium solution and wherein the substituent is selected from the group consisting of a substituted or unsubstituted acyl group having a carbon chain of from 10 to 36 carbon atoms, a substituted or unsubstituted acyl group containing at least one heterocyclic ring, a substituted or unsubstituted acyl group containing at least one aromatic ring, a substituted or unsubstituted carbamoyl group having a carbon chain of from 2 to 36 carbon atoms, a substituted or unsubstituted carbamoyl group containing at least one heterocyclic ring, and a substituted or unsubstituted carbamoyl group containing at least one aromatic ring.

2. The substitution-modified cellulose of claim 1, wherein said substituent is selected from the group consisting of a substituted or unsubstituted acyl group having a carbon chain of from 10 to 36 carbon atoms, a substituted or unsubstituted acyl group containing at least one heterocyclic ring and a substituted or unsubstituted acyl group containing at least one aromatic ring.

3. The substitution-modified cellulose of claim 1, wherein said substituent is selected from a substituted or unsubstituted carbamoyl group having a carbon chain of from 2 to 36 carbon atoms, a substituted or unsubstituted carbamoyl group containing at least one heterocyclic ring, and a substituted or unsubstituted carbamoyl group containing at least one aromatic ring.

4. The substitution-modified cellulose of claim 1, wherein the carbon chain of the acyl or carbamoyl group is interrupted by heteroatoms selected from the group consisting of O, S, N, P, Si, —CO—, —CONR—, —COO—, —SO— and —SO$_2$.

5. The substitution-modified cellulose of claim 1, wherein the substituent is an acyl group and the degree of substitution is 0.01 to 0.5.

6. The substitution-modified cellulose of claim 5, wherein the degree of substitution is 0.01 to 0.02.

7. The substitution-modified cellulose of claim 1, wherein the substituent is an acyl group and the degree of substitution of the cellulose in the dialysis membrane is 0.01 to 0.9.

8. The substitution-modified cellulose of claim 7, wherein the degree of substitution is 0.01 to 0.6.

9. A dialysis membrane comprising the substitution-modified cellulose of claim 1.

10. The dialysis membrane of claim 9, wherein the membrane is in a form selected from the group consisting of a flat film, a tubular film, and a hollow filament.

11. The substitution-modified cellulose of claim 3, wherein said carbamoyl group contains at least one heterocyclic ring.

12. The substitution-modified cellulose of claim 3, wherein the degree of substitution is from greater than 0.07 to 0.9.

13. The substitution-modified cellulose of claim 3, wherein the degree of substitution is from 0.1 to 0.9.

14. The substitution-modified cellulose of claim 3, wherein the degree of substitution is from 0.1 to 0.6.

15. The substitution-modified cellulose of claim 3, wherein the degree of substitution is from 0.16 to 0.9.

* * * * *

UNITED STATES PATENT AND TRADEMARK OFFICE
CERTIFICATE OF CORRECTION

PATENT NO. : 5,055,570
DATED : October 8, 1991
INVENTOR(S) : Michael DIAMANTOGLOU It is certified that error appears in the above-identified patent and that said Letters Patent is hereby corrected as shown below:

ON THE TITLE PAGE, IN THE ABSTRACT:

Line 7, delete "," (first occurrence);

Line 10, delete "," (first occurrence);

Line 12, delete "," (second occurrence).

Col. 1, line 23, after ")" insert --;--.

Col. 2, line 43, change "-N+R"$_2$" to -- -N$^+$R"$_2$--;

line 48, change "-N+HR$_2$" to -- -N$^+$HR$_2$--;

line 53, change "5C" to --5 C--;

line 68, change "caled" to --called--.

Signed and Sealed this

Sixteenth Day of March, 1993

*Attest:*

STEPHEN G. KUNIN

*Attesting Officer*     *Acting Commissioner of Patents and Trademarks*